United States Patent [19]

Fergason

[11] Patent Number: 5,541,745
[45] Date of Patent: Jul. 30, 1996

[54] ILLUMINATION SYSTEM FOR A DISPLAY USING CHOLESTERIC LIQUID CRYSTAL REFLECTORS

[76] Inventor: James L. Fergason, 92 Adam Way, Atherton, Calif. 94025

[21] Appl. No.: 187,162

[22] Filed: Jan. 25, 1994

[51] Int. Cl.⁶ ............................. G02F 1/13; G02F 1/1335
[52] U.S. Cl. ................. 359/37; 359/40; 359/48; 359/63; 359/65
[58] Field of Search ................. 359/37, 63, 65, 359/48, 40

[56] References Cited

U.S. PATENT DOCUMENTS

| | | | |
|---|---|---|---|
| Re. 32,521 | 10/1987 | Fergason | 359/156 |
| 2,885,551 | 5/1959 | Greanjas | 327/50 |
| 3,854,793 | 12/1974 | Kahn | 359/75 |
| 4,090,219 | 5/1978 | Ernstoff et al. | 348/742 |
| 4,097,128 | 6/1978 | Matsumoto et al. | 359/53 |
| 4,114,990 | 9/1978 | Mash et al. | 359/93 |
| 4,385,806 | 5/1983 | Fergason | 359/39 |
| 4,436,376 | 3/1984 | Fergason | 359/156 |
| 4,464,018 | 8/1984 | Gagnon | 359/41 |
| 4,468,703 | 8/1984 | Fujiwara | 358/464 |
| 4,540,243 | 9/1985 | Fergason | 359/156 |
| 4,582,396 | 4/1986 | Bos | 348/742 |
| 4,611,889 | 9/1986 | Buzak | 359/63 |
| 4,648,691 | 3/1987 | Oguchi et al. | 359/54 |
| 4,834,500 | 5/1989 | Kerr et al. | 359/43 |
| 4,859,031 | 8/1989 | Berman et al. | 359/36 |
| 4,879,603 | 11/1989 | Berman | 348/832 |
| 4,900,133 | 2/1990 | Berman | 359/36 |
| 4,923,286 | 5/1990 | Grupp | 359/75 |
| 4,958,915 | 9/1990 | Okada | 345/97 |
| 4,987,410 | 1/1991 | Berman et al. | 359/36 |
| 4,997,263 | 5/1991 | Cohen | 359/49 |
| 5,016,985 | 5/1991 | Kalmanash et al. | 359/36 |
| 5,050,966 | 9/1991 | Berman | 359/38 |
| 5,093,652 | 3/1992 | Bull | 345/150 |
| 5,128,782 | 7/1992 | Wood | 359/48 |
| 5,144,292 | 9/1992 | Shiraishi | 345/102 |
| 5,221,982 | 6/1993 | Faris | 359/48 |
| 5,235,443 | 8/1993 | Barnik et al. | 359/37 |
| 5,295,009 | 3/1994 | Barnik et al. | 359/65 |
| 5,313,225 | 5/1994 | Miyadera | 345/102 |
| 5,319,478 | 6/1994 | Funfschilling | 359/53 |
| 5,325,218 | 6/1994 | Willett et al. | 359/53 |
| 5,363,222 | 11/1994 | Ledebuhr | 359/63 |

FOREIGN PATENT DOCUMENTS

| | | |
|---|---|---|
| 579534 | 11/1988 | Australia. |
| 0351967 | 1/1990 | European Pat. Off. ............... 359/40 |
| 55-73023 | 6/1980 | Japan. |
| 56-114931 | 9/1981 | Japan. |
| 58-142315 | 8/1983 | Japan. |
| 62-47623 | 3/1987 | Japan. |
| 62-231221 | 10/1987 | Japan. |
| 63-13018 | 1/1988 | Japan. |
| 039320 | 1/1991 | Japan. |
| 3-249730 | 11/1991 | Japan. |
| 3-288885 | 12/1991 | Japan. |
| 2033602 | 5/1980 | United Kingdom. |

OTHER PUBLICATIONS

Schadt et al., "New Liquid Crystal Polarized Color Projection Principle", Japanese Journal of Applied Physics, vol. 29, No. 10, Oct. 1990, pp. 1974–1984.

*Primary Examiner*—Anita Pellman Gross
*Assistant Examiner*—Walter J. Malinowski
*Attorney, Agent, or Firm*—Renner, Otto, Boisselle & Sklar, P.L.L.

[57] ABSTRACT

A display system for direct viewing or projection includes a source of polarized light, an analyzer for reflecting or transmitting light as a function of the wavelength and polarization characteristic of incident light, and a display receiving light from said analyzer, the display being operable selectively to change a polarization characteristic of incident light, and light from the display being directed to the analyzer for reflection or transmission thereby. A method of display includes providing a source of polarized light, analyzing polarized light by selectively reflecting or transmitting light as a function of the wavelength and polarization characteristic of incident light, and creating a desired light pattern from light received from said analyzing step by selectively changing a polarization characteristic of incident light, and selectively transmitting light according to such pattern.

51 Claims, 8 Drawing Sheets

ILLUMINATION SYSTEM FOR A DISPLAY USING CHOLESTERIC LIQUID CRYSTAL REFLECTORS

TECHNICAL FIELD

The present invention relates generally, as is indicated, to optical illumination systems and, more particularly, to optical illumination systems for displays, especially relatively small size displays. The invention is particularly useful in head mounted displays, such as those sometimes referred to as heads-up displays, virtual reality displays, and multimedia displays and in projection displays.

BACKGROUND

In the field of optical display technology it is desirable to provide uniform, bright and efficient illumination. Some displays in the past have been relatively brighter at one or more portions and relatively less bright at others. It would be desirable to provide for substantially uniform illumination brightness across the area of an optical display. Some displays in the past have presented different color effects across the face. It is desirable to provide for substantially uniform color across the area or face of a display.

Some prior optical displays have required relatively large dimensions in order to distribute uniformly over the surface of the display illuminating or incident light. However, it often is desirable to minimize such display dimensions. For example, in the field of head mounted displays, such as those used in the field of virtual reality, heads-up display technology, etc. where the display is mounted on the head of an observer, it is desirable to minimize the size and weight of the display and the illuminating source.

Various techniques have been used in the past to improve efficiency of light illumination systems for displays and for the developing of light output by the display for viewing. For example, in some prior displays the intensity of the output light may be as small as only a few percent of the intensity of the illumination source for the display. It would desirable to increase the amount of output light able to be produced by a display relative to the amount of input light provided the display.

One of the problems in conventional liquid crystal displays, such as twisted nematic liquid crystal displays, is the inefficiency in light usage. Since the light usually needs to go through two polarizers, and additional color filters for color displays, the output light often only is two to four percent of the intensity of the incident light from the illuminating source. In liquid crystal television and computer displays, for example, the display is a transmissive one; the light source is on one side of the display while the viewer views the display from the opposite side. The losses in light in such systems are substantial and, therefore, such systems require a substantial amount of power for the light source to provide adequate illumination for satisfactory viewing. If the light source is supplied by battery power, usually the battery life is relatively short because of such substantial power requirement. It would be desirable to improve illumination efficiency for displays and, therefore, to increase battery life for such displays and systems using them.

Various head mounted displays and optical systems have been developed in the past. The present invention is useful to provide illumination for head mounted displays and for other types of displays.

The present invention may be used in an optical system or in a display system in which a common image is provided to both eyes of a person, and the invention also may be used in devices and displays in which different images are provided to respective eyes of a person. When different images are provided, they may be coordinated or not; when they are coordinated, though, they may be so coordinated so as to provide three dimensional or stereoscopic imaging. The invention also may be used with projection displays or as part of a projection display.

SUMMARY

Briefly, according to an aspect of the invention an illumination system for a display includes a source of polarized light, an analyzer for reflecting light to the display or transmitting light as a function of the wavelength and/or polarization characteristic of incident light, and light from the display being directed to the analyzer for reflection or transmission thereby.

According to another aspect, a method for illuminating a display includes supplying light having a polarization to an analyzer, reflecting or transmitting light by the analyzer as a function of the wavelength and polarization characteristic of incident light, the reflecting including reflecting light to a display for illuminating the display.

According to a further aspect, a display system includes a source of polarized light, an analyzer for reflecting or transmitting light as a function of the polarization characteristic of incident light, and a display receiving light from the analyzer, the display being operable selectively to change a polarization characteristic of incident light, and light from the display being directed to the analyzer for reflection or transmission thereby.

According to another aspect of the invention, input polarized light is supplied to a reflector, the reflector is operative to reflect such incident light as a function of the polarization characteristics and/or wavelength characteristics of such light, the reflected light being directed to a device for utilizing the light, such as an optical display or the like, and light from such utilizing device being directed back to the reflector for transmission or further reflection.

According to still another aspect, a display includes a light source for supplying light having a polarization characteristic, a reflector for reflecting light having one polarization characteristic and transmitting light of a different polarization characteristic, a light modulating display for receiving light reflected by the reflector and for directing light toward the reflector, the display including a means that is selectively operable to change the polarization characteristic of light thereby to determine what light is transmitted and what light is reflected by the reflector.

According to even another aspect of the invention, an optical device includes a source of polarized light, an analyzer, a folded optical system coupling the source and the analyzer, the folded optical system including a reflector reflecting light toward the analyzer, the analyzer including a selective analyzer for transmitting light having one polarization characteristic and for reflecting toward the reflector light having a different polarization characteristic.

According to yet another aspect, a high intensity folded illumination system includes a source of light, a first polarizer for polarizing light from the source with a circular polarized characteristic, an analyzer for reflecting incident light from the light source that has the same direction of polarization as the mentioned polarizer, a reflector for reflecting light received from the analyzer back toward the analyzer for transmission or reflection by the analyzer as a function of the polarization characteristic of such light, and a display operative to change the polarization characteristic of light directed to the analyzer in order to determine what light is transmitted and what is reflected by the analyzer.

Still a further aspect of the invention relates to a high intensity folded illumination system for an optical display including a source of polarized light having a particular polarization characteristic, a display operative to alter the polarization characteristic of light directed thereto, an analyzer for receiving light from the source and directing the light to the display, the analyzer being operative to reflect light at a particular call polarization characteristic and to transmit light that does not have such polarization characteristic, and a reflector for reflecting light from the display to the analyzer for selective transmission by the analyzer as a function of the polarization characteristic of light.

Another aspect relates to a cholesteric liquid crystal reflector having a configuration to improve uniformity of distribution of light to a display.

A further aspect relates to providing a white or multicolor liquid source for a display.

An additional aspect relates to frame sequential or field sequential illuminating of a display using different color light sources.

Still another aspect relates to displays using illumination sources and various features hereof.

Another aspect relates to illumination and output techniques for head mounted displays and the like.

Another aspect relates to illumination and output techniques for projection displays.

An aspect relates to a method of display including providing a source of polarized light, analyzing polarized light by selectively reflecting or transmitting light as a function of the wavelength and polarization characteristic of incident light, creating a desired light pattern from light received from said analyzing step by selectively changing a polarization characteristic of incident light, and selectively transmitting light according to such pattern.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

Figures 1, 2A:
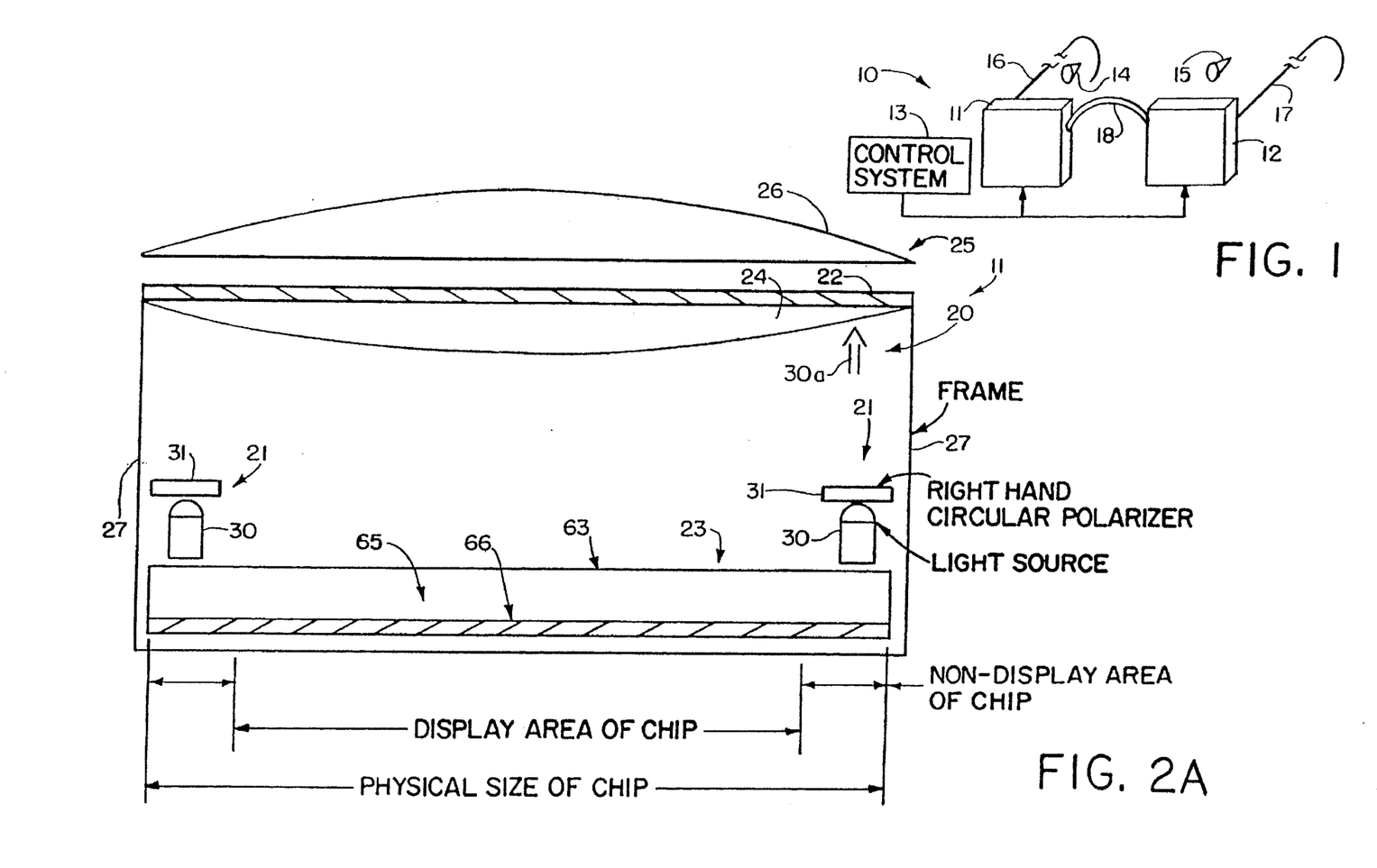
FIG. 1 is a schematic view of a head mounted display system including a pair of display subsystems, each with an illumination system of the invention.

Referring to the drawings, wherein like reference numerals designate like parts in the several figures, and initially to FIG. 1, a head mounted display system 10 includes a pair of display subsystems 11, 12 and a control system 13 for creating images intended to be viewed by the eyes 14, 15 of a person. The display subsystems 11, 12 may be positioned in relatively close proximity, for example, at approximately one inch distance, to the respective eyes 14, 15. A mounting mechanism, such as temple pieces 16, 17 and a nose bridge 18 may be provided to mount the display subsystems of the display system 10 on the head of the person.

The control system 13 in conjunction with the display subsystems 11, 12 is intended to create images for viewing by the eyes. Those images may be monochromatic. The images may be multicolor. The images may be two-dimensional or they may provide a three dimensional, stereoscopic effect. Stereoscopic effect viewing is obtained when the control system 13 operates the display subsystems 11, 12 to provide, respectively, right eye and left eye images that are sufficiently distinct to provide depth perception. Right eye, left eye imaging and depth perception are techniques used in some stereoscopic imaging and viewing systems which are commercially available.

The display subsystems 11, 12 may be identical. The control system 13 provides control and/or power input to the display subsystems 11, 12 to create images for display to the eyes 14, 15. The display system 10 may be a head mounted display, such as a heads-up display, a virtual reality display, or a multimedia display. The control system 13 may be generally a control system of the type used in known head mounted displays to create such images. Such a control system may provide for control of color, light intensity, image generating, gamma, etc. The display subsystems 11, 12 may include focusing optics so as to focus the image created by the display subsystems for comfortable viewing, for example from a few inches up to a few feet in front of the eyes, say, from about 20 inches to about several feet in front of the eyes.

It will be appreciated that the features of the present invention may be used in the display system 10 of the head mounted type in which are they are plural display subsystems. Also, features of the invention may also be employed in other types of display systems. One example is a display system that uses only a single display subsystem of the type described herein. Such display subsystem may be located in proximity to an eye for direct viewing; alternatively, such display subsystem may be used as part of a projection type display in which light from the display subsystem is projected onto a surface where the image is formed for viewing. Various lenses and/or other optical components may be used to direct from the display subsystem light to create an appropriate image at a desired location.

For brevity, though, the various features of the invention will be described below with respect to display subsystem 11; however, it will be appreciated that the various features described below are applicable to the display subsystem 12 and to other types of display subsystems and display systems in which the features of the invention may be employed.

Display Subsystem 11 With Illumination System 20

Figure 2B:
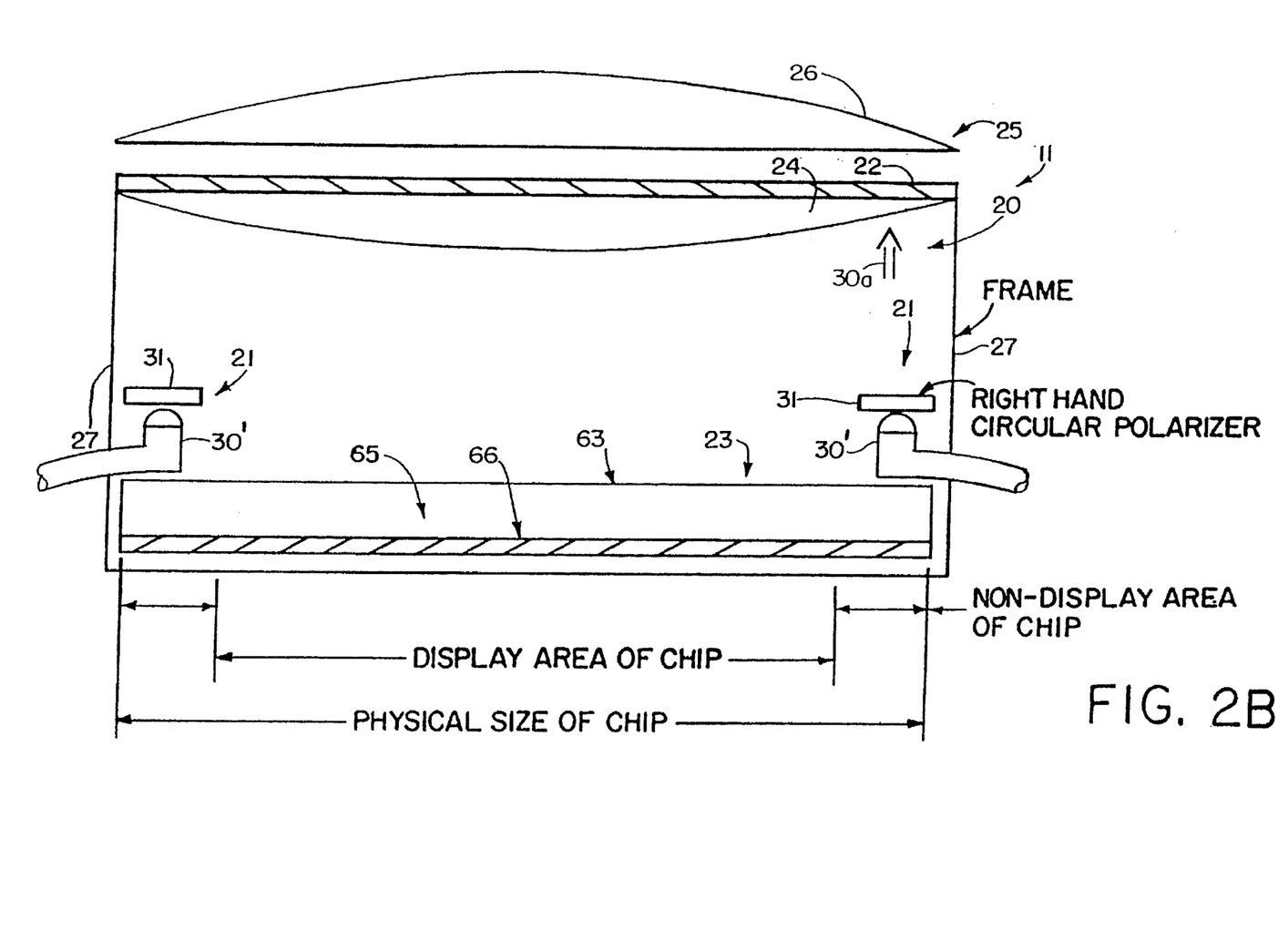
FIG. 2 is a schematic elevation view of an illumination system in accordance with the present invention used in a display subsystem.

Turning to FIG. 2, an illumination system 20 in accordance with the present invention used in a display subsystem 11 is illustrated. The illumination system 20 is folded. The folded illumination system reduces the thickness or depth requirement for the display subsystem 11 while still allowing for substantially uniform illumination in the display subsystem.

As is seen in FIG. 2, the illumination system 20 includes a source of polarized light 21 and a reflector 22 (sometimes referred to as an analyzer) which is able to transmit or to reflect light as a function of the wavelength of the light and/or the polarization characteristic of the light. Light from the illumination system 20 is directed to the front or face of a display 23. Light from the display 23 is reflected toward the reflector/analyzer 22 for transmission thereby to be viewed, projected, or for reflection, etc. A lens 24 may be included in the illumination system 20 to help distribute light substantially uniformly across the area of the display 23. The lens 24 also may be part of an optics system generally designated 25, which may include one or more lenses, mirrors, and/or other optical elements, one such lens 26 being shown in FIG. 2. The lens 24 and optics system 25 may cooperate to provide an image focused at a comfortable distance relative to and for viewing and focusing by the eye of a viewer, to project an image onto a screen, etc. The various components of the illumination system 20 and display 23, which form the display subsystem 11 may be mounted in a frame or other support 27.

In the illumination system 20, the source of polarized light 21 is shown in FIG. 2 as a light source 30 and a circular polarizer 31. An exemplary light source 30 is a light emitting diode. The light emitting diode may have a light output of a specific wavelength or it may have a light output over a band or range of wavelengths. In the latter case, it may be desirable to filter the light from the light emitting diode 30 by a conventional color filter (not illustrated) to block one or more wavelengths or wavelength bands of light in order to coordinate the wavelength or wavelength band of the light 30a incident on the reflector 22 with respect to the wavelength-determined reflection characteristics of the reflector.

The light source 30 may be a plurality of light emitting diodes located about the outer perimeter of the display 23, for example, outside the viewing area or active area of the display, located either in front of or laterally adjacent an edge of the display, for example. Two of such light emitting diodes 30 are shown in FIG. 2. Alternatively, a single light emitting diode light 30 may be used in the illumination system 20 to provide light to the display 23.

Other exemplary light sources which may be used in connection with the invention include fluorescent light sources, incandescent light sources, and light channeled by fiber optics 30' (FIG. 2A) from a source internal or external of the frame 27 of the display subsystem 11. The light source may be monochromatic. Alternatively the light source may be multicolor and even may be white. A white light usually includes all colors or substantially all colors. The light source may include red, green and blue components that can be used to provide a full color system, as is described in greater detail below. The light source 30 may also be a metal halide lamp, such as one which produces light having red, green and blue spectral peaks. Thus, it will be appreciated that various devices may be used as the light source 30. For brevity, reference below to the light source 30 will be with respect to light emitting diodes, however, it will be appreciated that other light sources alone or in combination with light emitting diodes or in combination with each other also may be used in the invention.

The polarizer 31 is a circular polarizer, the handedness of which is coordinated with the characteristics of the reflector 22. The polarizer 31 may be a left hand circular polarizer or a right hand circular polarizer. Alternatively, the polarizer 31 may be composed of plural polarizers, which cooperate to form a circular polarizer; an example is a linear polarizer (sometimes to referred to as a plane polarizer) in optical series with a quarter wave plate, the appropriate axis of which is oriented at 45 degrees relative to the transmission axis of the linear polarizer, as is known. It will be appreciated that light sources and polarizers other than those described herein, but which functionally are equivalent to provide a source of polarized light 21 may be used in the illumination system 20 of the invention.

The reflector 22 is formed of cholesteric liquid crystal material or equivalent providing the equivalent functions described herein. Several properties of cholesteric liquid crystal material make such material particularly suitable for the present invention. Cholesteric liquid crystal material tends to reflect circular polarized light that has the same direction, i.e., left hand or right hand circular polarization, or same handedness, as the left or right handedness of the twist characteristic of the cholesteric liquid crystal material, provided the wavelength of the incident light on the cholesteric liquid crystal material is of a wavelength or within a wavelength band that is determined by the composition, pitch, or other characteristic of the cholesteric liquid crystal material. Therefore, in the case of cholesteric liquid crystal material having a right hand twist and being operative to reflect green light of right hand polarization, upon the directing of green right hand polarized light from the light source 21 onto the reflector 22, such light will be reflected by the reflector to illuminate the display 23. Light that is left hand circular polarized and/or that is not green or within a suitable wavelength band that includes green light, is transmitted by the reflector 22.

The combination of the light source 21 and the reflector 22 provide a folded optical path for light travel from the source to the display. The folded path helps reduce the thickness requirement for the display subsystem 11 and also provides bright efficient illuminating of the display. Since a cholesteric liquid crystal reflector is an efficient reflector, often more efficient than a specular reflector for the particular wavelength and polarization characteristic of incident light, bright, substantially uniform illumination of the display 23 is possible by the illumination system 20.

The display 23 may be a liquid crystal display or some other type of display. The display may include an active matrix substrate and drive or some other type of drive. The display 23 is operative, preferably is selectively operative, in response to an input, such as electrical, magnetic, or temperature input, to receive incident light from the illumination system 20 and to direct light to the reflector 22 and may alter or not alter a characteristic of the incident light thereby to determine whether the light is to be reflected or transmitted by the reflector 22. Such alteration preferably is of polarization characteristic; however, such may be wavelength or may be some other characteristic that determines whether or not the light is to be transmitted by the reflector 22. The display 23 may be about one square inch in area, for example, or may be larger or smaller, as may be desired.

The display 23 may be a twisted nematic liquid crystal display, a variable birefringence liquid crystal display, examples of which are known. A folded variable birefringence liquid display useful as display 23 is disclosed in concurrently filed, commonly owned, U.S. patent application Ser. No. 07/187,050, the entire disclosure of which hereby is incorporated by reference. Other displays that provide the indicated functions of being able to alter the polarization and/or wavelength characteristic of light also may be used in the display subsystem 11 in conjunction with the illumination system 20 of the invention.

Cholesteric Liquid Crystal Reflector 22

Figure 3:
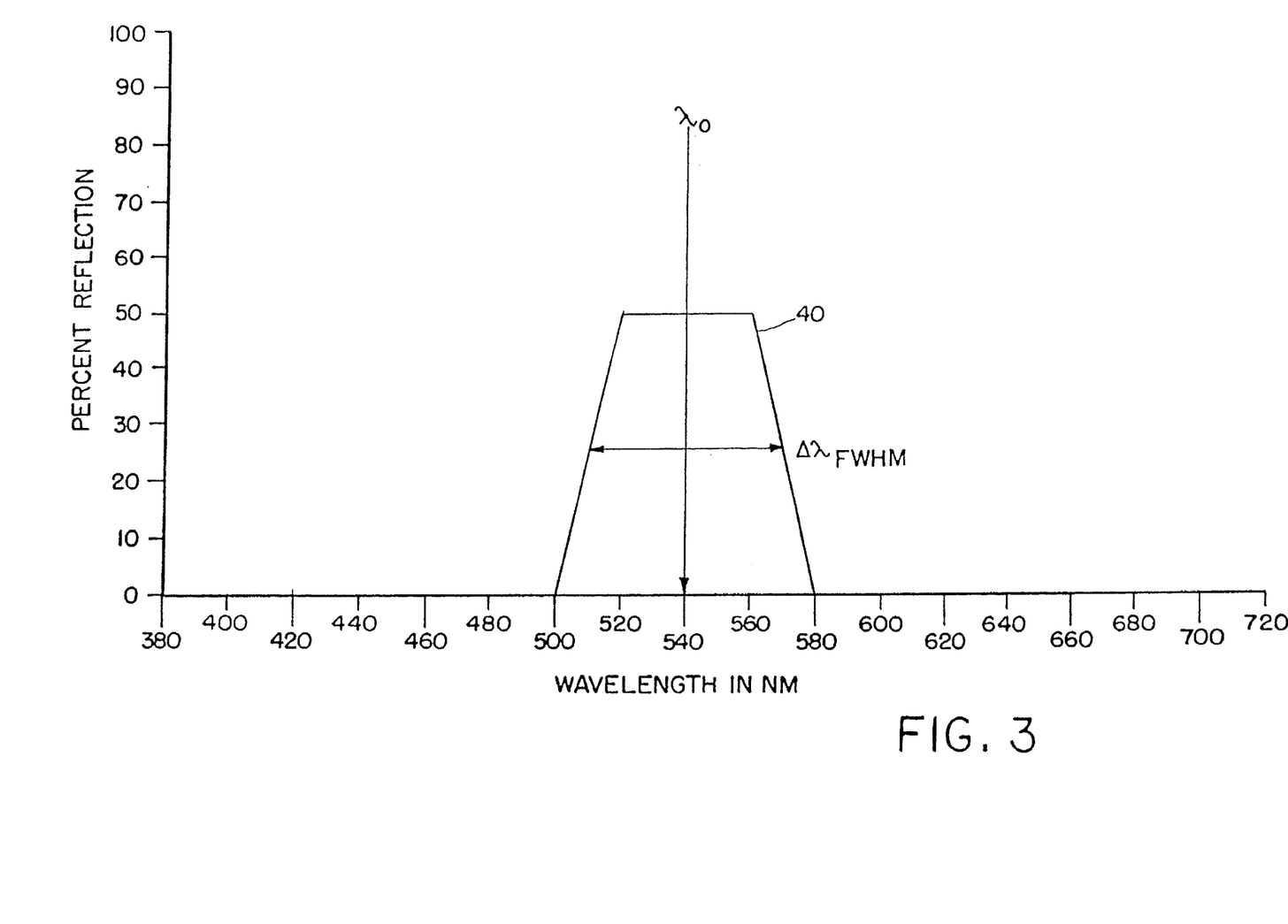
FIG. 3 is a graph depicting reflectivity vs. wavelength for an aligned cholesteric liquid crystal film used in the reflector of the illumination system of the invention.

Referring to FIG. 3, a graph depicts reflectivity vs. wavelength for an aligned cholesteric liquid crystal film used in the reflector 22. The cholesteric liquid crystal film is operable to reflect green light having a specified circular polarization, e.g., left or right hand circular polarization. In the graph of FIG. 3 the X-axis represents wavelength in nanometers (nm); and the Y-axis represents percent reflection of incident light directed to the cholesteric liquid crystal film of the reflector 22, for example.

In FIG. 3, curve 40 represents percent reflection as a function of wavelength by the mentioned cholesteric liquid crystal film when unpolarized white light is incident on that film. A portion of the spectrum of the unpolarized white light is transmitted by the film without alteration; that portion does not fall under the curve 40 shown in FIG. 3. However, there is a wavelength band over which the cholesteric liquid crystal film does affect the light. The cholesteric liquid crystal film will reflect the circular polarized component of incident light that corresponds to the twist direction (say right hand) of the liquid crystal material and falls within the specified reflection wavelength band of the cholesteric liquid crystal material. The cholesteric liquid crystal film will transmit the other, say left hand, circular polarized component of such light both within and outside of such wavelength band. If the cholesteric liquid crystal film had a left hand twist, it would reflect the left hand circular polarized component and transmit the right hand circular polarized component.

The wavelength band over which such polarized reflection occurs is determined by the following equation or relationship:

$$\frac{\Delta\lambda_{FWHM}}{\lambda_o} = \frac{\Delta N_{AVG}}{N_{AVG}}$$

$\Delta N_{AVG}$=the avenge birefringence of the cholesteric liquid crystal $N_{AVG}$=the average index of refraction of the cholesteric liquid crystal $\lambda o$=the center wavelength of the reflective band for normally incidence light $\Delta\lambda_{FWHM}$=the wavelength width of the reflection band The center wavelength and the width of the wavelength band over which polarized light is reflected (the reflection band) can be tailored to a specific wavelength and range in the spectrum, respectively, by a proper choice of the cholesteric liquid crystal material. These characteristics are a function, for example, of the composition of the cholesteric liquid crystal material, the pitch thereof, and so forth, as is known. In FIG. 3, the reflection band of the cholesteric liquid crystal material of reflector 22 is centered at 540 nm and has a wavelength width or band of about 70 nm. Within the wavelength band the polarizing efficiency is very high, that is, the light reflected (e.g., green light which is 540 nm) or the light transmitted by the cholesteric liquid crystal film is almost perfectly polarized with circular polarization characteristic. Transmitted light is circular polarized opposite the twist direction of the cholesteric liquid crystal material; and reflected light is the same handedness circular polarization as the twist direction of the cholesteric liquid crystal material.

Figure 4:
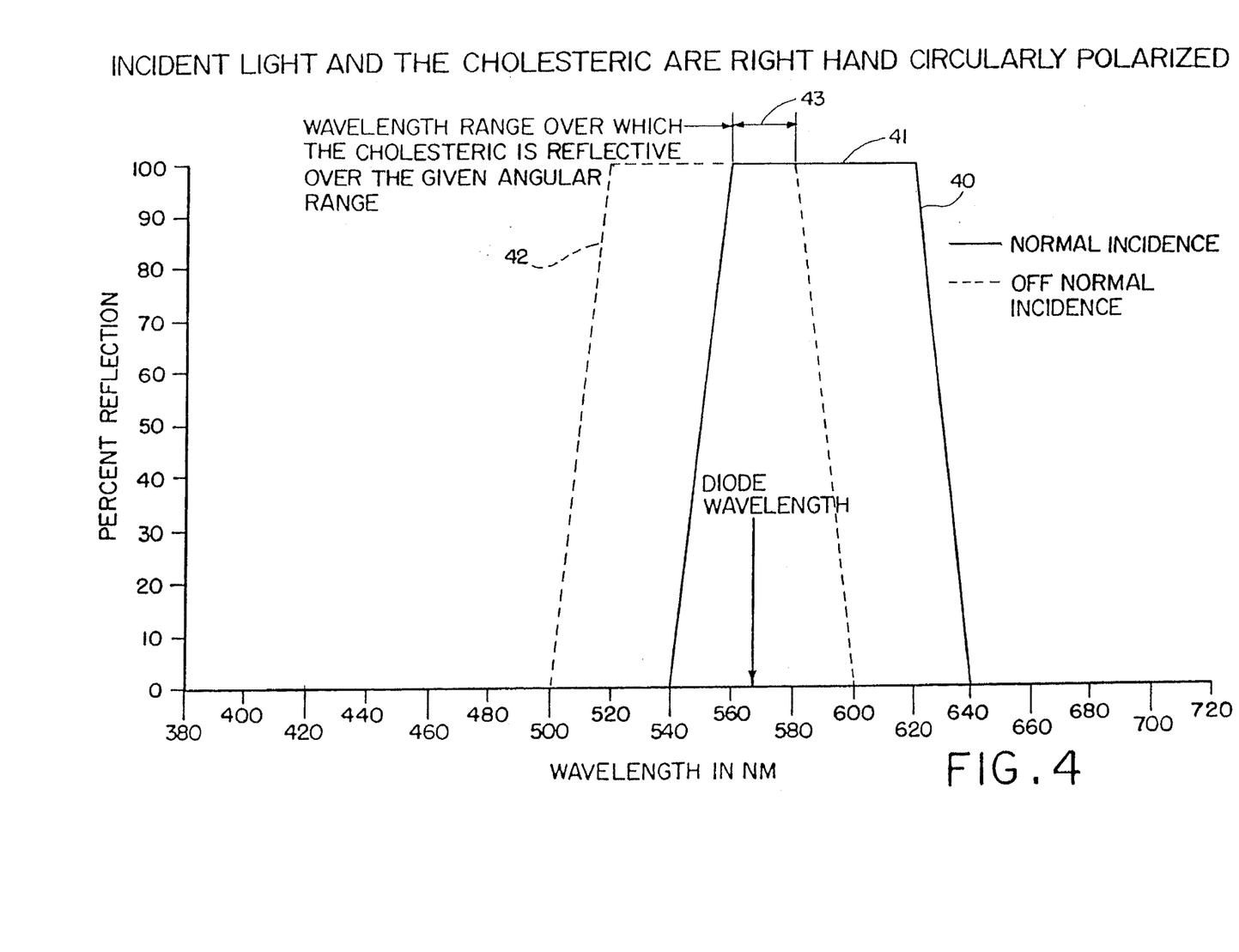
FIG. 4 is a graph of reflectivity vs. wavelength as a function of angle of incidence of light on an aligned cholesteric liquid crystal film of the reflector of the illumination system the invention.

Reference now is made to FIG. 4. The graph of FIG. 4 shows reflectivity vs. wavelength as a function of angle of incidence of light on an aligned cholesteric liquid crystal film of reflector 22, for example. On the X-axis is shown wavelength of incident light in nanometers (nm), and on the Y-axis is shown percent reflection of incident right hand circular polarized light on the cholesteric liquid crystal film that has a right hand twist.

An optical characteristic of the cholesteric liquid crystal film used in the reflector 22 is that the center wavelength of the reflection/transmission band shifts toward a shorter wavelength as the angle of incidence of the incoming light increases. This characteristic is illustrated in FIG. 4. The relationship between the center wavelength at normal incidence (incident on the film at an angle that is 90 degrees to the plane of the film, or is parallel to a normal to the film) and the center wavelength at an off-axis angle of incidence is given by the following relationship:

$$\lambda = \lambda_o \left[ \text{SIN}^{-1} \left( \frac{1}{N_{AVG}} \text{SIN}\Theta \right) \right]$$

$\lambda$=the center wavelength of the reflective band at the off axis reflection angle $\Theta$=the angle between the normal and the reflected ray The solid line in FIG. 4 represents the curve 40 shown in FIG. 3. Light under the curve 40 is right hand circular polarized (or in any event the same hand circular polarization as the twist direction of the cholesteric liquid crystal material in the film of the reflector 22). Therefore, substantially all light falling below the projection of the line 41 of the curve 40 onto the X-axis will be reflected by the cholesteric liquid crystal reflector 22. The curve 40 in FIG. 4 represents the reflection/transmission band of the reflector 22 for light that is at normal incidence (incident at an angle of 90 degrees to the plane of the reflector 22). Curve 42 shown in dotted line in FIG. 4 represents the wavelength range over which the cholesteric liquid crystal film of the reflector 22 is reflective when the incident light is at an angle other than normal incidence, e.g., at 10 degrees to normal, 20 degrees to normal, etc., (in any event, other than at 90 degrees to ate plane of the cholesteric liquid crystal film of the reflector 22).

The arrow 43 represents the wavelength range over which the cholesteric liquid crystal reflector 22 is reflective over a given angular range of incidence from normal incidence to an angle other than normal incidence at which the curve 42 was determined. The wavelength of the light produced by the illumination system 20, for example, by a light emitting diode 30, should fall within the range depicted by the arrow 43, which is the case in FIG. 4 where the wavelength is shown at approximately 565 nm.

For a given range of the angle of incidence of light from the illumination system 20 in the display subsystem 11, for example, there will be a wavelength band which remains within the reflection/transmission band, and that wavelength band is depicted by the arrow 43 in FIG. 4. The illumination system 20 should be designed so that the wavelength of the illumination system falls at the short wavelength side of the normal incidence reflection band depicted by curve 40. In this way, the wavelength of the illumination source 20 will fall within the reflection band when the light is incident at an acceptable angle that is off the normal angle (90 degrees to the plane of the reflector 22). Such acceptable angle of incidence will be a function, for example, of the angular field of view of the display subsystem 11, usual positioning of the display subsystem 11 relative to the eye 14, angle over which light is to be projected by the display subsystem 11 when used in a projection type display, thickness of the display subsystem 11 for acceptable distribution of incident light from source 20 on the display 23, etc.

In currently available cholesteric liquid crystal materials, the value $$\Delta\lambda_{FWHM}$$

can be made as large as about 100 nm. To reflect the entire spectrum of a white light illumination source 20, it is expected that more than one, perhaps two, three or more, cholesteric liquid crystal reflectors in optical series would be required for the reflector 22. Each such cholesteric liquid crystal reflector would reflect a portion of the spectrum as a function of the characteristics of the cholesteric liquid crystal material thereof.

Figure 5A:
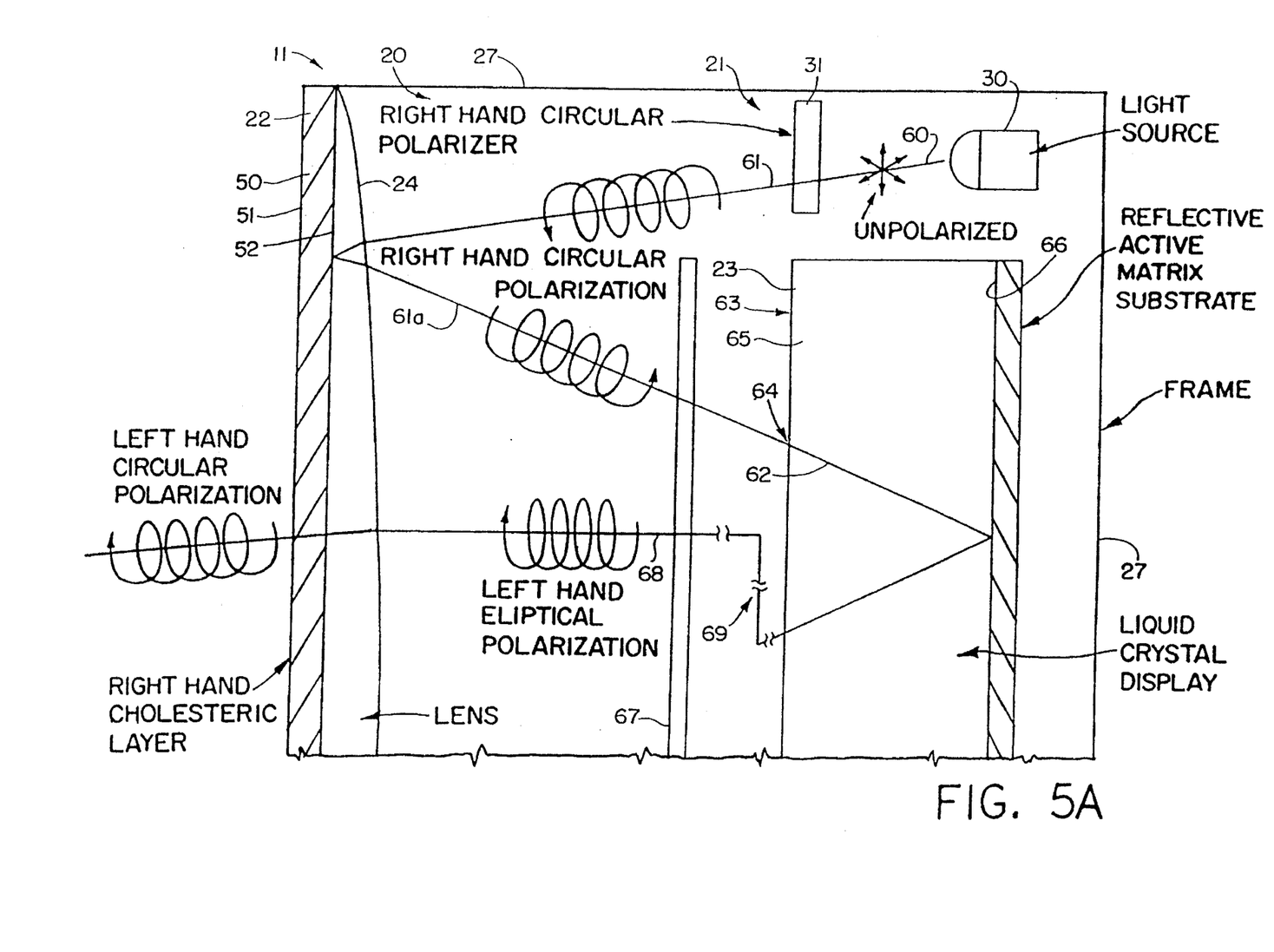
FIGS. 5A and 5B are schematic elevation views of the illumination system of the invention showing operation thereof.
Figures 5B, 6:
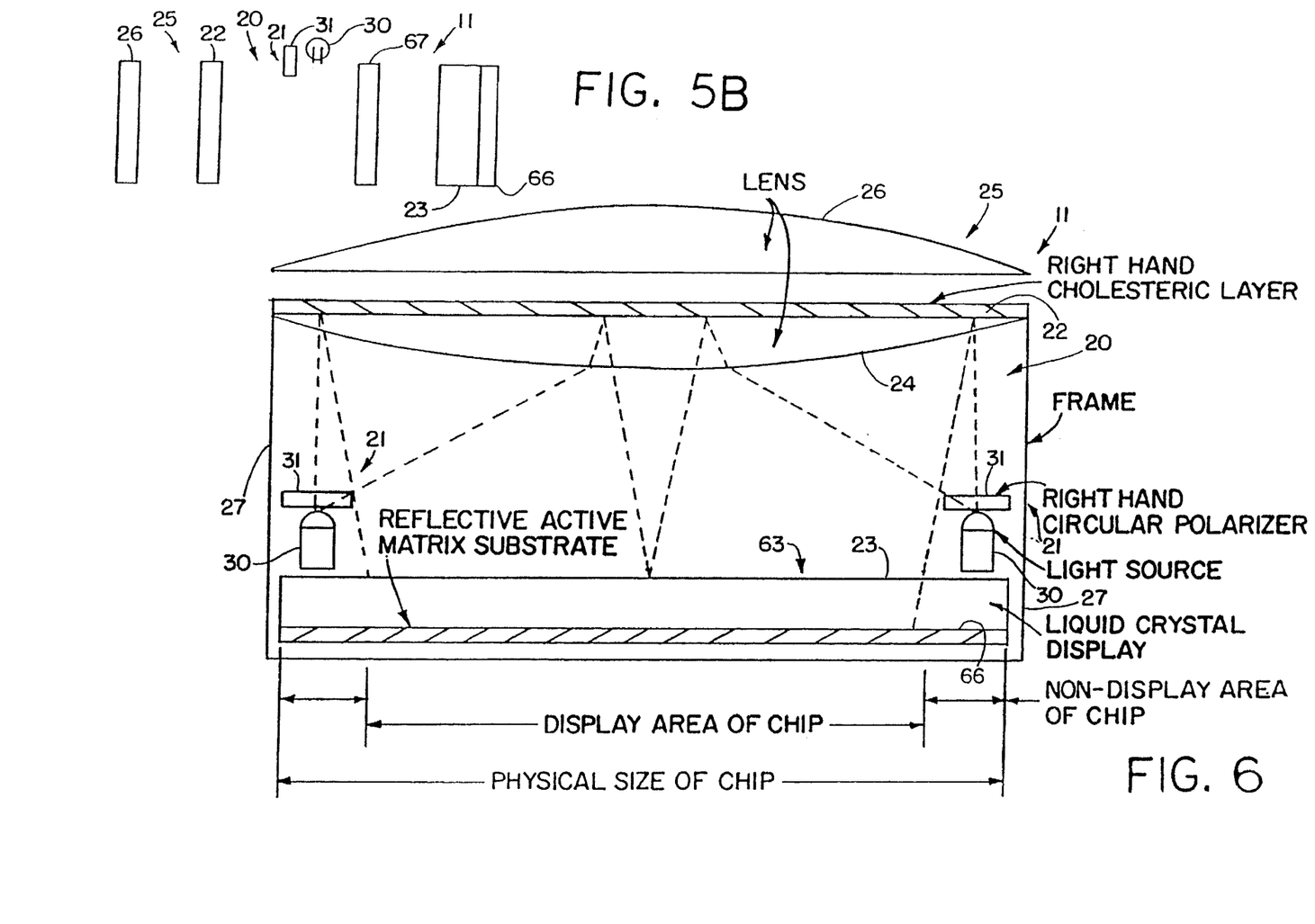
FIG. 6 is a schematic elevation view of the illumination system of the invention showing an exemplary lighting pattern.

As is seen in FIGS. 1 and 5, the reflector 22 is formed of a cholesteric liquid crystal material 50 contained between two relative rigid, flat, transparent substrates or plates 51, 52. Those plates may be glass, plastic or some other material. The reflector 22 may be made of other types of material.

In designing the reflector 22, alignment of the cholesteric liquid crystal material 50 also may be considered. An exemplary cholesteric liquid crystal material is sold by Wacker Chemical as Cholesteric Liquid Crystal Silicones. If a homogeneous alignment layer is placed on the inner surfaces of both substrates 51, 52., i.e., the surfaces confronting the cholesteric liquid crystal material 50, then the cholesteric liquid crystal material would adopt a planar texture. A planar texture reflects incident light rays as would a specular mirror. However, in the illumination system 20 of the present invention including the source of polarized light and the reflector 22, a more uniform distribution of light intended to be reflected to the display 23 could be obtained if the reflection from the cholesteric liquid crystal reflector were somewhat more diffuse than that obtained by specular reflection. This is accomplished by applying an alignment layer (such alignment material being known), which tends to align the cholesteric liquid crystal material parallel to the substrate face to only one of the substrates 51, 52. By this means, the axis of the cholesteric liquid crystal material and the planes of reflection become somewhat randomized and the reflectivity becomes somewhat more diffuse.

The following are three exemplary mixtures R-1, R-2, and R-3 of cholesteric liquid crystal material which may be used for reflecting red light. Also presented below are three exemplary mixtures B-1, B-2, and B-3 and G-1, G-2 and G-3 of cholesteric liquid crystal material which may be used for reflecting blue (designated prefix "B") or for reflecting green light (designated prefix "G"). For a full three color reflector system using three reflectors as is described below in the multicolor embodiment, one reflector may be made of red material indicated below; one of blue, and one of green. Percentages are by weight.

R-1: CN: 33.59% OCC: 21.21% CC: 21.20% E-49: 24.00%

R-2: CN: 39.90% CC: 14.25% CCin: 2.85 % E-63: 43.00%

R-3: CN: 22.10% OCC: 13.95% CC: 13.95% E-7: 50.00%

CN is cholesteryl nonanoate; CC is chloride; OCC is Oleyl carbonate, and CCin is Cinnamate. E-49 and E-63 are derived from E-14 of E. Merck.

B-1 OCC: 60% E-49: 40%

B-2: OCC: 60% PPMeOB 40%

B-3: OCC: 50% PPMeOB 10% PPPOB: 40%

G-1: CN: 37.92% OCC: 23.94% CC: 23.94% E-49: 14.20%

G-2: OCC: 50% PPMeOB: 38.2% PPPOB: 15.0%

G-3: BL-009:60.5% CB-15:39.5%

PPMeOB is 4-pentylphenyl-4'-methoxybenzoate; PPPOB is 4-pentylphenyl-4'-pentyloxybenzoate; and BL-009 is sold by E. Merck.

Operation of Display Subsystem 11 using the Illumination System 20

Referring to FIGS. 5A and 5B, the operation of the illumination system 20 in the display subsystem 11 is illustrated. A single light emitting diode light source 30 is shown. It will be appreciated that there may be more than one such light emitting diode or that the light source may be some other type of device. Preferably the light emitting diode is outside the viewing area or viewing angle of the display subsystem 11, for example being located laterally adjacent a side edge of the display 23, as is seen in FIG. 5A, or being located in front of the display at an or adjacent an edge of the display 23, as is shown in FIG. 2.

In FIG. 5A the polarization characteristics of a light ray as it travels from the light source 30 to the eye 14 of a viewer is shown. Light symbolized by light ray 60 emitted by the light emitting diode 30 is unpolarized. The polarizer 31 placed in front of the light emitting diode 30 converts the light ray 60 to right hand circular polarization light 61. The light ray 61 is refracted by the lens 24 and is reflected by the cholesteric liquid crystal layer 50 of the reflector 22. (The wavelength of the light ray 61 and the angle of incidence of the light on the reflector 22 is consistent with the reflectivity vs. wavelength graph of FIG. 4 falling within the range designated by the arrow 43 of that graph). The reflected light ray 61 remains right hand circular polarized, as is depicted at light ray 61a.

The light ray 61a is designated 62 after it enters the front face 63 of the display 23 at 64. In the display 23 the polarization characteristic of the light ray 62 may or may not be changed. Such a change would be a function of the characteristics of the display 23, e.g., whether or not it retards light transmitted therethrough.

In the example illustrated in FIG. 5A, the display 23 includes liquid crystal material 65, for example nematic liquid crystal, and a reflector 66. The reflector 66 may be, for example, a specular reflector. An example of such a specular reflector may be a metal surface, a reflective active matrix substrate, silicon material, or other light reflecting material. Other types of displays 23 and reflectors 66 also may be used. The display 23 is intended selectively to affect the light transmitted therethrough, for example, to create an image of an object, alphanumeric information, etc. The effect at varying locations of the display 23 may be a function of the characteristics of the liquid crystal material 65 and the operation or energization of the display 23 and, in particular, the various portions thereof used to create an image, for example. The display 23 may include a wave plate 67, such as a quarter wave plate, to provide dark field and/or other functions, e.g., as is described in the above mentioned patent application. For example, a ¼ wave plate 67 may introduce a phase shift in the light transmitted therethrough to cooperate with the phase shift characteristic of a variable birefringent liquid crystal type display 23 to obtain the desired effect on the light.

As the light ray 62 travels through the display 23 it may encounter some amount of retardation which in general converts the light to right hand elliptical polarization (or maintains such right hand elliptical polarization characteristic). The light ray 62 then is reflected by the rear reflector 66 as ray 68 and as a result of that specular reflection the phase of the light is reversed, as is well known, for example, the right circular (or elliptical) polarized light converted to left hand elliptical polarization. Traveling back through the display, in particular through the liquid crystal 63 thereof, the ray 68 may encounter further retardation but remains left hand circular or elliptically polarized.

For convenience of illustration, the ray 68 is shown in the large scale illustration of FIG. 5A shifted at 69 to facilitate showing its travel path in the display subsystem 11 without requiring a further drawing figure. The ray 68 is refracted by the lens 24. Part of the light ray 68 may be transmitted by the cholesteric liquid crystal reflector 22. The extent to which the ray 68 is transmitted, as compared to the extent it is reflected by the reflector 22, is determined by its ellipticity. Specifically, elliptically polarized light can be thought of as composed of a left hand circular polarized component and a right hand circular polarized component. The two components would, in general, have different amplitudes. Only the left hand circular polarized component would be transmitted by the cholesteric liquid crystal reflector 22; the right hand circular polarized component would be reflected back to the display 23.

If the display 23 does not convert the incident light to circular polarized light or elliptically polarized light, but rather operates solely on plane polarized light selectively to alter the plane of polarization, the quarter wave plate 67 and/or other optical components may be used to provide the light output from the display 23 with suitable circular polarization (or elliptically polarized characteristics) or wavelength characteristics to enable the reflector 22 to function as a polarization analyzer, or the like, for example, selectively to transmit or to reflect light as a function of such characteristic.

Briefly referring specifically to FIG. 5B, the parts of the subsystem 11 including illumination system 20 are shown in schematic form. Light from the LED 30 is circularly polarized by circular polarizer 31. According to the wavelength and circular polarization direction of such light the cholesteric reflector 22 reflects the light toward the display 23. A wave plate, such as a quarter wave plate 67, may be provided in the light path. The wave plate 67 may be omitted, if desired. Light transmitted through the display 23 is reflected by the reflector 66 back through the liquid crystal of the display toward the reflector 22. The cholesteric reflector 22 then serves an analyzer function, transmitting only that light received from the display 23 which has the correct circular polarization. Optics 25, including optics 26 can deliver the light for viewing to form an image, e.g., at about 20 inches to about a few feet, even though the lens 26 may be located only approximately one inch in front of the eye of a person.

The Lighting Pattern in the Illumination System 20

Turning to FIG. 6, the lighting pattern in the illumination system 20 used in an exemplary display subsystem 11 is shown. The cholesteric liquid crystal reflector 22 is spaced from the display 23 by a distance equal to about half the diagonal of the display 23. In the illustrated example of FIG. 6, the display 23 is approximately square in viewable area. The shape of the lens 24 and the emission pattern of the light emitting diode light source 30 are adjusted so that each of the illustrated two right emitting diodes 30 would illuminate about half the face 63 of the liquid crystal display 23. In this way the angle of incidence of the light rays on the lens 24 and hence the cholesteric liquid crystal reflector 22 will not be too oblique. The more oblique, the narrower ordinarily will be the range represented by the arrow 43; the less oblique, the larger the range of the arrow 43, and, therefore, the larger the viewing angle of the display 23 without degradation of the viewed image by allowing the wavelength of the light emitted by the diodes 30 to remain within the reflective band of the cholesteric liquid crystal material.

The lens 24 may be part of a lens system of a virtual reality display or other heads-up display in order to place the image created by the display subsystem 11 at a convenient viewing distance from the eye. The illustrated plano-convex lens 24 on the display side of the cholesteric liquid crystal reflector 22 as part of the illumination system also may serve as part of the optics required to adjust the image viewing system. A second plano-convex lens 26 and/or other optical components generally designated 25 may be placed on the other side of the cholesteric liquid crystal reflector 22 to complete the optics in a very compact and convenient form.

An example of a type of display 23 useful in the display subsystem 11 is a variable birefringence liquid crystal display. Examples are disclosed in U.S. Pat. Nos. 4,385,806, 4,436,376, 4,540,243, Re. 32,521, and 4,582,396, which are incorporated by reference. For a variable birefringence nematic liquid crystal display, a quarter wave plate may be provided between the reflector 22 and the face 63 of the display to convert the circular polarized light to plane polarized light for delivery to the display. In the display the polarization is affected, e.g., undergoes retardation of one quadrature component relative to another, or not, depending on whether or not the display is energized, for example. Such retardation may have the effect of rotating plane of polarization of the light. The light is specularly reflected by the reflector 64 and is directed back to the quarter wave plate. The output light from the quarter wave plate will have a circular (or elliptical) polarization characteristic that is a function of whether or not the display has rotated the plane of polarization. Depending on that characteristic, light will be transmitted or not by the reflector 22.

Cholesteric Liquid Crystal Polymer Reflector Embodiment

Figure 7:
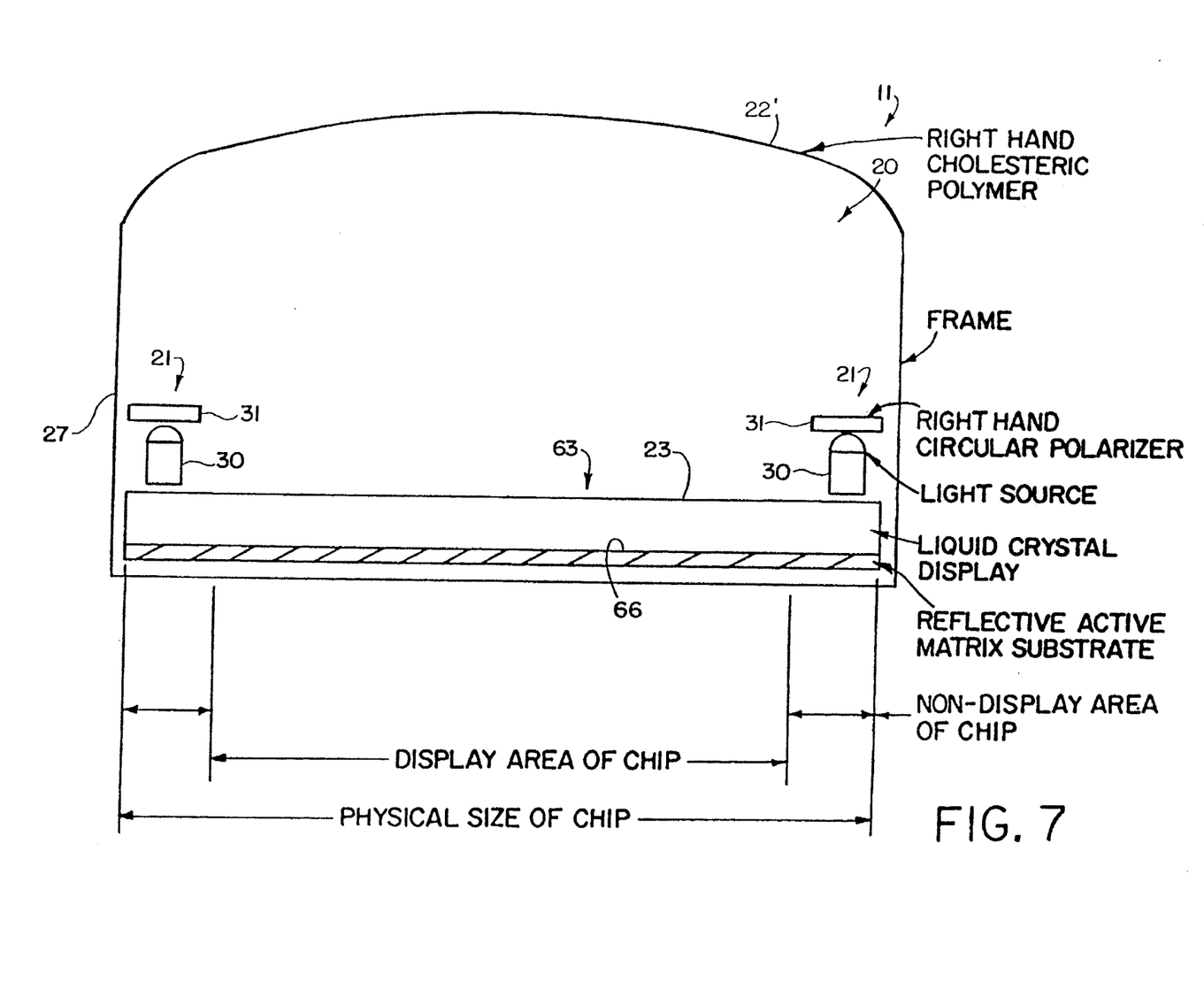
FIG. 7 is a schematic elevation view of the illumination system of the invention using a cholesteric liquid crystal polymer reflector.

In FIG. 7 a display subsystem 11 generally of the type described above has a modified cholesteric liquid crystal reflector 22'. The reflector 22' is formed of a cholesteric liquid crystal polymer that has the same twist direction as the polarizer 31, for example, right hand twist and right circular polarized light, respectively.

The reflector 22' is curved generally in the manner illustrated to improve the uniformity of distribution of light from the light source 30 across the face 63 of the display 23. Thus, the curvature of the reflector 22 is such that the light emitted by the light emitting diode 30 is distributed uniformly across the face 63.

Multiple Reflectors 22

Figure 8:
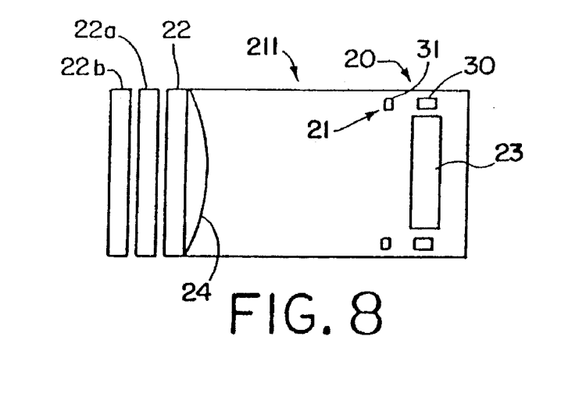
FIG. 8 is a schematic elevation view of the illumination system of the invention using plural cholesteric liquid crystal reflectors.

In FIG. 8 an embodiment of the invention using plural cholesteric liquid crystal reflectors as part of an illumination system 20 in a display subsystem 211 is shown. The various components of the display subsystem 211 are substantially the same as those in the described above with respect to the display subsystems 11 and 111. However, in the display subsystem 211, particularly in the illumination system 20 thereof, the light source 30 provides light of more than one wavelength. Although the reflector 22 may be able to reflect light of one of those wavelengths, it is not able to reflect light of the other wavelength. However, a second one of the cholesteric liquid crystal reflectors 22a, for example, is able to reflect light of the other wavelength. Therefore, the two reflectors 22, 22a would be able to reflect both wavelengths produced by the light source 30.

The light source 30 may produce more than two wavelengths of light, for example, red, green and blue wavelengths. In such case, three cholesteric liquid crystal reflectors 22, 22a, 22b may be used respectively to reflect a particular wavelength of light in the manner described above. The respective cholesteric liquid crystal reflector which reflects a particular wavelength is transparent to other wavelength.

Thus, it will be appreciated that the illumination system 20 shown in FIG. 8 may include a white light source 30. The several cholesteric liquid crystal reflectors used in the illumination system 20 of FIG. 8 as pan of the display subsystem 211 are operative to reflect the various wavelengths of such white light to the display 23. The display subsystem 211 of FIG. 8 using a white light illumination system 20 is able to produce output images that are black and white. This output is distinguished from the color of the output images produced by the display subsystems 11 and 111 described above wherein the color of the output light is a function of the wavelength produced by the light source of the respective illumination system.

Full Color Frame Sequential Illumination System and Display

Figure 9:
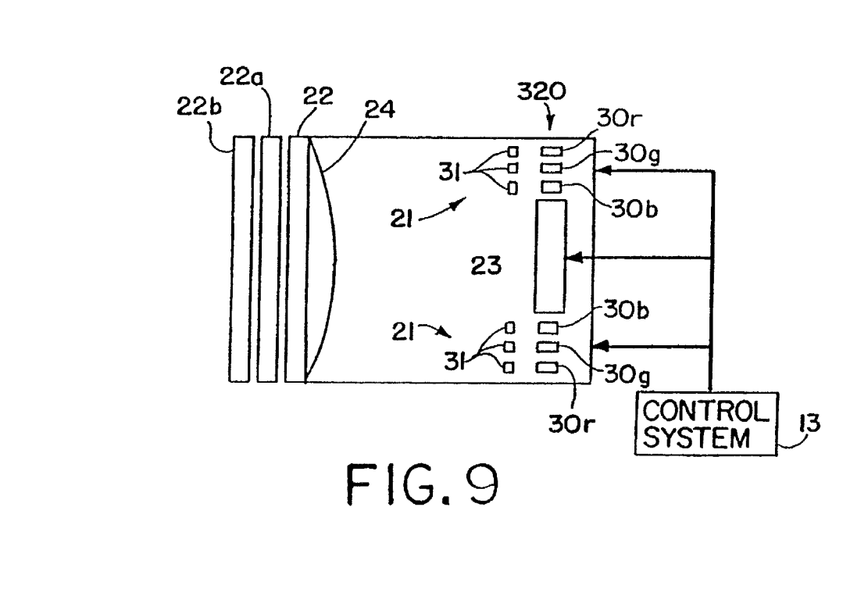
FIG. 9 is a schematic elevation view of the illumination system of the invention using plural cholesteric liquid crystal reflectors and plural light sources of respective colors to provide a multicolor or full color display.

Turning to FIG. 9, a full color display subsystem 311 including illumination system 320 is shown. The various portions of the display subsystem 311 are substantially the same as the portions of the above described display subsystem 211. However, in the display subsystem 311 the illumination system 320 includes several sources of light, each having a different wavelength. For example, three separate light sources 30r, 30g, 30b provide red, green and blue wavelength light, respectively, or light that is in respective wavelength bands or ranges that include red, green and blue, respectively. The light sources may be respective light emitting diodes or they may be other sources of red, green and blue light or other respective wavelengths of light, as may be desired for use in the display subsystem 311. The cholesteric liquid crystal reflector 22 is able to reflect green light; the reflector 22a is able to reflect red light; the reflector 22b is able to reflect blue light. Such reflection occurs, as was described above, when the circular polarization characteristic of the light is the same direction as the twist direction of the cholesteric liquid crystal material in the respective reflector. The reflectors 22, 22a, 22b are transparent to the other polarizations of incident light and to the other wavelengths of incident light.

The illumination system 320 is intended sequentially to illuminate the display 23 (or respective portions of the display) with respective wavelengths of light. For example, for a period of time the display 23 (or portion thereof) is illuminated with red light; subsequently illumination is by either green or blue light; and still subsequently illumination is by the other of green or blue light. Such sequential illumination may be carried out sufficiently rapidly so that respective red, green and blue images created by the display 23 when illuminated by the respective colors of light are output from the display subsystem 311 and are integrated by the human eye. As a result, the human eye effectively sees a multicolor image. Other examples of frame sequential switching to provide multicolor and/or full color outputs are known in the art. Various advantages inure to a frame sequential multicolor display, including the ability to provide high resolution with approximately one-third the number of picture elements required for a full color r, g, b display system in which respective pixels are red, green or blue.

The sequential delivering of red, green and blue light to the display 23 is coordinated by the control system 13 with the driving of the display 23. Therefore, when a red image or a portion of a red image is to be produced by the display 23, it is done when red light is incident on the display 23; and the similar type of operation occurs with respect to green and blue images.

If the respective light sources 30r, 30g, 30b are light emitting diodes, they may be sequentially operated or energized to provide light in coordination with the operation of the display 23 under direct control and/or energization by the control system 13. Alternatively, the control system 13 may be coordinated with whatever other means are used to provide the respective red, green and blue color lights of the light source.

Another example of frame sequential or field sequential operation of a display subsystem like that shown at 11 herein is described in the above-referenced patent application. Another example of field sequential operation is described in U.S. Pat. No. 4,582,396, which is mentioned above and incorporated by reference.

Figure 10:
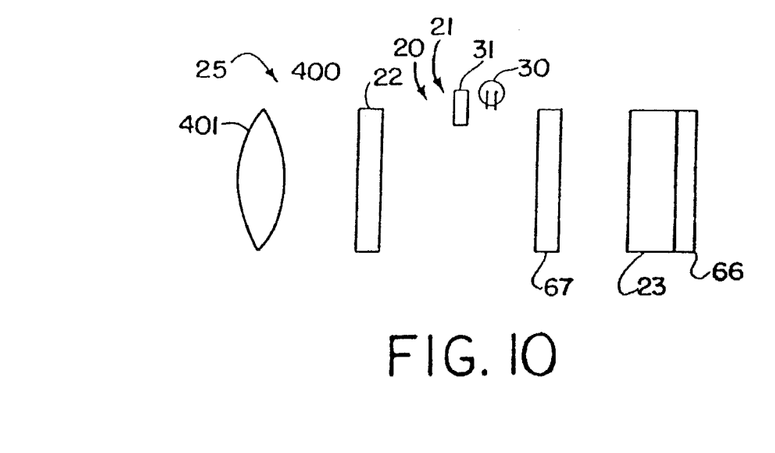
FIG. 10 is a schematic side elevation view of a projector using the illumination system of the invention.

Briefly referring to FIG. 10, a projection type display according to the invention is shown at 400. The display 400 includes the various parts of the display subsystem 11 described above with respect to FIG. 5B, for example. However, in the display 400 there is a projection lens as part of the optics 25, for example, which is able to project the image formed by the display, which is illuminated by the illumination system 20, for viewing. The image may be projected onto a screen, for example, Which is viewed in transmission mode or in reflection mode.

For a display subsystem 11 used in an exemplary head mounted display 10, the viewing area of each liquid crystal cell 23 and display system 11 may be on the order of approximately 0.75 inch diagonal. A display 23 according to the invention may have a pixel resolution of, for example, 360 columns by 256 rows, with a pixel pitch at 40 microns by 40 microns, an array size of 0.906 inch by 0.660 inch and 0.708 inch diagonal. The display may be operable sufficiently fast to provide images at the speed of approximately 180 frames per second. Power to the circuitry of the display may be less than 2 watts with voltage being supplied at between about 30 V DC and about 35 V DC. Signal formats may be interlaced or non-interlaced. Also, one may use 30 frames per second operation. One also may use 1 micron geometry or 3 micron geometry for the pixels. These values are provided by way of example and are not intended to be limiting.

The invention can be used with an illumination control disclosed in concurrently filed, commonly owned U.S. patent application Ser. No. 08/187,063, entitled, "Variable Intensity High Contrast Passive Display", the entire disclosure of which is incorporated by reference.

From the foregoing it will be appreciated that the present invention provides for illumination of a display and the display of a viewable output. The illumination may be monochromatic, multicolor, or white light.

I claim:

1. An illumination system for a display, comprising a source of polychromatic, polarized light, a plurality of analyzes in optical series for reflecting light to a common display or transmitting light from the display as a function of the wavelength and/or polarization characteristic of incident light, and light from the display being directed to said analyzers for reflection or transmission thereby.

2. The system of claim 1, said source comprising a source of substantially white light.

3. The system of claim 1, said source comprising a plurality of separately operated different color light sources for sequentially providing to the analyzer light of different respective colors.

4. The system of claim 1, said analyzers comprising a cholesteric reflectors which selectively reflects or transmits light as a function of the circular polarization direction and the wavelength of the light incident thereon.

5. The system of claim 1, said source comprising a source of circularly polarized light.

6. A display system, comprising the illumination system of claim 1, and further comprising a display receiving light from said analyzers, said display being operable selectively to change a polarization characteristic of incident light, and light from said display being directed to said analyzers for reflection or transmission thereby.

7. A display as set forth in claim 6, said source of polarized light comprising a source of circularly polarized light, said analyzer comprising a cholesteric liquid crystal reflector which reflects light having circular polarization of a prescribed direction and is within a prescribed wavelength band and which otherwise transmits light, and said display comprising a liquid crystal display.

8. A display as set forth in claim 6, and further comprising means for mounting the display on the head of a person.

9. A method for illuminating a display, comprising supplying multicolor light having a polarization characteristic to plural analyzers, reflecting or transmitting light by the analyzers as a function of the color and polarization characteristic of incident light, said reflecting comprising reflecting light to a common display for illuminating the display.

10. The method of claim 9, said reflecting comprising using a cholesteric reflector to reflect light of a wavelength range and polarization characteristic and to transmit light which is outside such wavelength range or has a different polarization characteristic.

11. The method of claim 9, further comprising reflecting light from a display for transmission of at least some of such light as a light output.

12. The method of claim 11, further comprising providing such light output for projection display or for direct viewing.

13. The method of claim 9, said supplying and said reflecting comprising directing light along a folded path to illuminate the front of the display.

14. The method of claim 9, said supplying comprising supplying different color light in time sequence.

15. The method of claim 9, said supplying comprising supplying light from plural locations about the area of the display.

16. A method of display, comprising sequentially supplying different wavelengths of polarized light, reflecting substantially all of such polarized light to a common display using a plurality of analyzers in optical series creating a desired light pattern in said display from light received from said reflecting step by selectively changing a polarization characteristic of incident light, and selectively transmitting light according to such pattern through said plurality of analyzers.

17. The method of claim 16, said supplying comprising supplying multicolor light.

18. The method of claim 16, said supplying comprising supplying white light.

19. The method of claim 16, said supplying comprising supplying circularly polarized light.

20. The method of claim 16, said creating comprising using a reflective liquid crystal display to change the polarization characteristic of light reflected thereby.

21. The method of claim 20, said analyzing comprising delivering light to a cholesteric liquid crystal reflector, and said selectively transmitting comprising reflecting light that has had the direction of circular polarization changed by the display so such light transmits through such cholesteric liquid crystal reflector.

22. A front illumination system for an object to be illuminated comprising a source of light having a distinguishable characteristic, means for directing light from the source along a folded path toward an object to be illuminated, said means for directing including means for selectively transmitting light from the object to be illuminated based on such distinguishable characteristic said source of light comprising means for producing light of different respective wavelengths, said source of light being located adjacent said the object to be illuminated, said means for directing light comprising a cholesteric liquid crystal reflector for selectively transmitting light or reflecting light depending on the optical polarization of such light and for selectively transmitting light or reflecting light depending on the wavelength of such light, said cholesteric liquid crystal reflector comprising means for reflecting light having specified wavelength characteristics and optical polarization characteristics from the source of light to the object to be illuminated and for transmitting light having specified optical polarization characteristics reflected by the object to be illuminated, said cholesteric liquid crystal reflector comprising a plurality of cholesteric liquid crystal reflectors in optical series, each having a different band of wavelengths over which light having a prescribed optical polarization characteristic is reflected.

23. The system of claim 22, said means for producing comprising means for illuminating the object to be illuminated with different respective color light in time sequence.

24. The system of claim 23, further comprising a miniature reflective display as the object to be illuminated, and control means for operating said display in coordination with sequential operation of said means for producing to provide a frame sequential multicolor output.

25. The system of claim 22, at least one of said cholesteric liquid crystal reflectors comprising a liquid crystal polymer.

26. A from illumination system for an object to be illuminated, comprising a source of light having a distinguishable characteristic, means for directing light from the source along a folded path toward an object to be illuminated.

said means for directing including means for selectively transmitting light from the object to be illuminated based on such distinguishable characteristic, said source of light comprising plural light sources located adjacent said object to produce respectively light of different wavelengths, and further comprising means for sequentially operating respective light sources to produce light of different respective wavelengths for sequentially illuminating the object to be illuminated, a miniature reflective display as the object to be illuminated, and control means for operating said display in coordination with sequential operation of said light sources to provide a frame sequential multicolor output.

27. The system of claim 26, said display comprising a liquid crystal display.

28. The system of claim 26, said light sources comprising light emitting diodes for producing light output of different colors.

29. The system of claim 28, further comprising polarizing means for circularly polarizing light from said light emitting diodes prior to impingement on said means for directing.

30. An optical system for selectively transmitting or reflecting light of plural colors, comprising a first reflector for selectively transmitting or reflecting light incident thereon depending on the wavelength characteristic of the light and an optical polarization property of the light, and a second reflector in optical series with said first reflector, and oriented substantially parallel to said first reflector and substantially perpendicular to the incident light, for selectively transmitting or reflecting light depending on a different wavelength characteristic of the light and an optical polarization property of the light, said reflectors comprising cholesteric liquid crystal polymer material.

31. The system of claim 30, wherein two of the wavelength characteristics are ranges of wavelengths and wherein part of said respective ranges overlap.

32. A display system, comprising a reflective liquid crystal display, a source of light adjacent said display for illuminating said display, means for folding an optical path between said source of light and said display, said means for folding comprising means for selectively transmitting light or reflecting light depending on an optical characteristic of the light, and said display being operative to change such optical characteristic.

33. The display system of claim 32, said display comprising an active matrix liquid crystal display.

34. The display system of claim 32, said display comprising a twisted nematic liquid crystal display.

35. The display system of claim 32, said display comprising a variable birefringence display.

36. The display system of claim 32, said display having an area of about 1 square inch.

37. An optical display system comprising two display systems as set forth in claim 32, and further comprising means for mounting said display systems relative to the head of a person.

38. A projector comprising the display of claim 32, and further comprising a projection lens.

39. A display system comprising a reflective liquid crystal display, a source of light for illuminating said display, means for folding an optical path between said source of light and said display, said means for folding comprising means for selectively transmitting light or reflecting light depending on an optical characteristic of the light, and said display being operative to change such optical characteristic, said source comprising fiber optics for conducting light from a light source.

40. A display system, comprising a reflective liquid crystal display, a source of light for illuminating said display, means for folding an optical path between said source of light and said display, said means for folding comprising means for selectively transmitting light or reflecting light depending on an optical characteristic of the light, and said display being operative to change such optical characteristic, said source comprising a plurality of light emitting diodes said means for selectively transmitting light or reflecting light comprises means for reflecting plural colors of light, said means for reflecting plural colors comprises plural reflectors in optical series, each reflector being operative to transmit at least one color light that is reflected by the other reflector, said source of light comprising a source of circularly polarized light of plural colors, said display being operative selectively to change the polarization characteristic of light as such characteristic to determine whether light is transmitted by a respective reflector.

41. A display system, comprising a reflective liquid crystal display, a source of light adjacent said display for illuminating said display, and an analyzer lying in a plane parallel to the plane of said display for selectively transmitting light or reflecting light as a function of the wavelength and polarization characteristic of the light, said display being operative to change such optical characteristic.

42. The system of claim 41, said source comprising a multicolor source.

43. The system of claim 42, said analyzer comprising a plurality of analyzers in optical series which transmit or reflect light as a function of polarization characteristic of the light incident thereon and the respective color of the light.

44. The system of claim 41, said source comprising a plurality of separately operated different color light source for sequentially providing to the analyzer light of different respective colors.

45. The system of claim 44, said analyzer comprising a plurality of analyzers which respectively transmit or reflect light as a function of polarization characteristic of the light incident thereon and the respective color of the light.

46. The system of claim 44, further comprising a control means for operating said display in coordination with sequential operation of said plurality of separately operated different color light sources for producing to provide a frame sequential multicolor output.

47. The system of claim 41, said analyzer comprising a cholesteric reflector which selectively reflects or transmits light as a function of the circular polarization direction and the wavelength of the light incident thereon.

48. The system of claim 41, said analyzer comprising a plurality of cholesteric reflectors in optical series, each being operable with respect to a different wavelength range of light.

49. The system of claim 41, said source comprising a source of circularly polarized light.

50. The systems of claim 41, said source of light comprising a source of circularly polarized light, said analyzer comprising a cholesteric liquid crystal reflector which reflects light having circular polarization of a prescribed direction and is within a prescribed wavelength band and which otherwise transmits light.

51. The system of claim 41, further comprising means for mounting the display on the head of a person.

* * * * *